United States Patent [19]
Kraus

[11] Patent Number: 6,115,888
[45] Date of Patent: Sep. 12, 2000

[54] PLASTIC HOLDING STRAP

[75] Inventor: Willibald Kraus, Grünstadt, Germany

[73] Assignee: TRW Automotive Electronics & Components GmbH & Co. KG, Germany

[21] Appl. No.: 09/245,004

[22] Filed: Feb. 4, 1999

[30] Foreign Application Priority Data

Feb. 4, 1998 [DE] Germany ............... 198 04 357

[51] Int. Cl.[7] .................. B65D 63/00; F16L 3/00
[52] U.S. Cl. .......... 24/16 PB; 24/17 AP; 24/30.5 P
[58] Field of Search ............. 24/16 PB, 17 AP, 24/30.5 P, 297; 248/74.3

[56] References Cited

U.S. PATENT DOCUMENTS

| | | | |
|---|---|---|---|
| 3,147,522 | 9/1964 | Schumm | 24/30.5 P |
| 3,731,347 | 5/1973 | Caveney et al. | 24/16 PB |
| 3,991,444 | 11/1976 | Bailey | 24/16 PB |
| 4,558,495 | 12/1985 | Olsen | 24/16 PB |
| 5,112,013 | 5/1992 | Tolbert et al. | |
| 5,135,188 | 8/1992 | Anderson et al. | |
| 5,224,244 | 7/1993 | Ikeda et al. | 24/16 PB |
| 5,577,698 | 11/1996 | Liu et al. | 24/17 AP |
| 5,803,413 | 9/1998 | Benoit et al. | 248/74.3 |

FOREIGN PATENT DOCUMENTS

| | | |
|---|---|---|
| 0 583 554 | 2/1994 | European Pat. Off. |
| 24 02 289 | 11/1975 | Germany . |
| 295 15 493 | 2/1996 | Germany . |

Primary Examiner—Victor N. Sakran
Attorney, Agent, or Firm—Fay, Sharpe, Fagan, Minnich & McKee, LLP

[57] ABSTRACT

A plastic holding strap is provided for bundling elongate objects and fastening the elongate bundled objects to an associated support member. The holding strap includes a first holding element adapted for connection onto the associated support member. An elongate profiled strap element extends from the first holding element for encircling and fastening a first bundle of associated elongate objects onto the holding element for connection in turn to an associated support member. In order to provide additional holding capability and to enable a wider range of application of the plastic holding strap, a second holding element is provided for selective intermatable attachment onto the first holding element. The second holding element defines at least one receiving area for selective connection to one or more associated articles in addition to the items fastened to the first holding element. Preferably, the at least one receiving area is formed in the shape of a resilient clip and alternatively includes a plurality of spaced-apart resilient clips for parallel attachment of additional associated articles to the second holding element. The second holding element provides supplemental holding capability to carry objects in addition to the items bundled by the strap element of the first holding element.

20 Claims, 2 Drawing Sheets

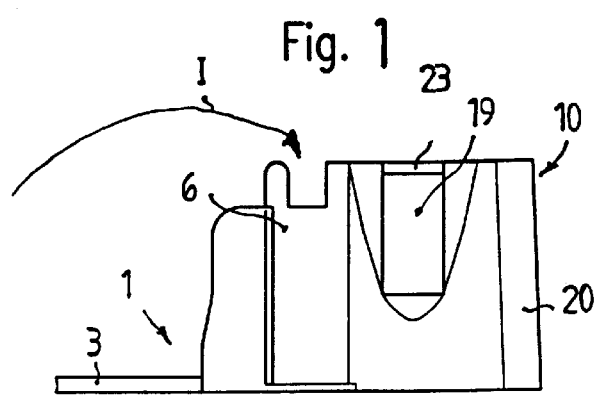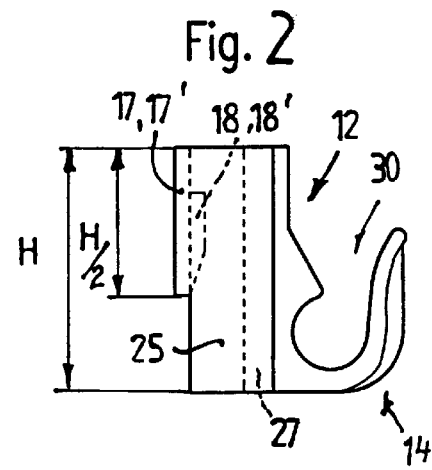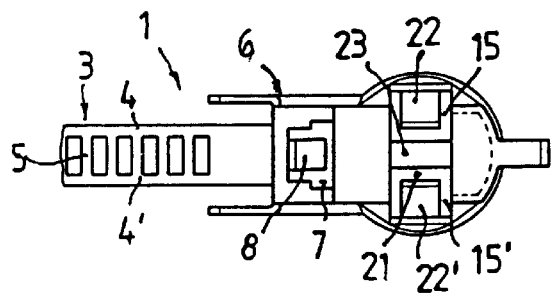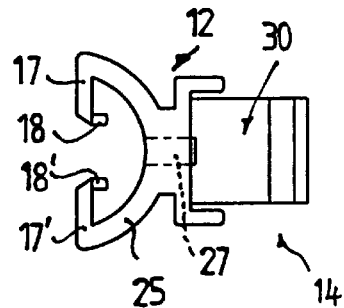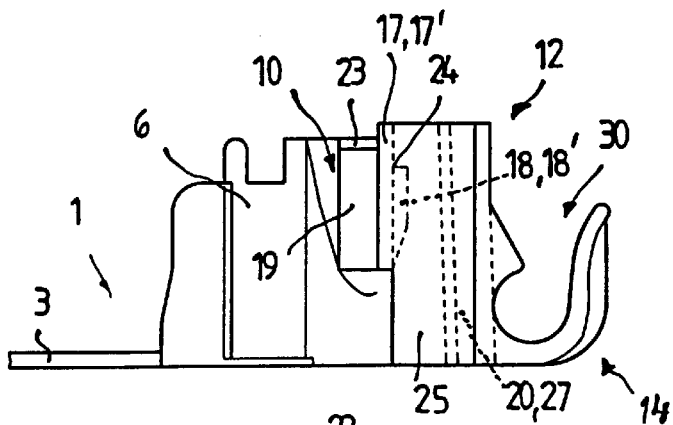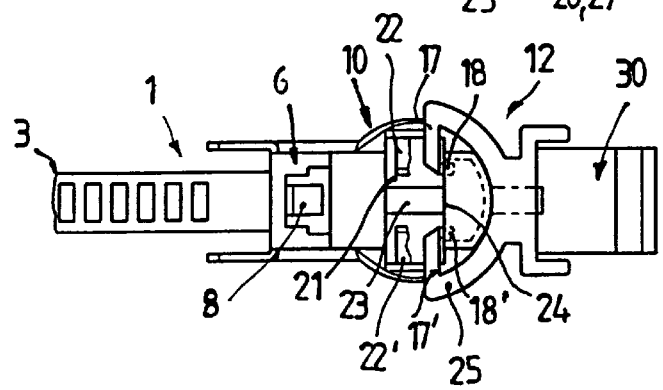

PLASTIC HOLDING STRAP

BACKGROUND OF THE INVENTION

The subject invention is directed to the art of plastic holding straps of the type used for looping around, fastening, and bundling cables and other tubular articles to an associated support member and, more particularly, to the art of plastic holding elements of the type including a holding element body adapted for connection onto associated support members.

Plastic holding straps of the type under consideration are commonly used to bundle cables and other elongate objects such as tubes or the like in a secured manner. Typically, the plastic holding straps are formed as a long relatively thin flexible profiled strap element including a pair of spaced apart parallel longitudinal strips that extend along the length of the strap element. A plurality of transverse rung members extend in a spaced apart relationship between the pair of parallel longitudinal strips. One end of the plastic holding element defines a passage opening adapted to accept the other free end of the holding strap therethrough. At least one elastic locking element is disposed within the passage opening for engaging the plurality of transverse rung members. The elastic locking element is typically embedable relative to the longitudinal strips and transverse rung members. Some plastic holding straps provide means for connection onto an associated support member.

Holding straps of the type described above are well known in the art. A number of patents including U.S. Pat. No. 3,991,444, and German Patents DE-GM 297 07 757.0 and DE-OS 38 07 173 describe a plastic holding strap that includes a strap element that is selectively insertable into a head piece. The head piece is in turn selectively connectable with a support either prior to or after the strap element is inserted into the head piece.

Another form of plastic holding strap includes a holding element disposed immediately beneath the head piece. In that type of holding strap, the holding element disposed beneath the head piece is selectively connectable with an associated support.

All of the prior plastic holding strap constructions including the aforementioned straps have in common the feature that the elongate tubes or cables are secured after looping and fixing the strap component into place in the head or body member. After the strap is secured in place within the body member, the holding strap has fulfilled its function. No additional tubes or cables can be accommodated.

It would be desirable, therefore, to provide a plastic holding strap that is capable of a wider application range beyond simply encircling and bundling a single group of elongate tubular objects, cables, and the like. It is often desirable to fasten an additional second group of tubes, cables, or other articles onto a plastic holding strap that is already secured around a first group of elongate tubular objects.

SUMMARY OF THE INVENTION

The subject invention provides a plastic holding strap that includes an auxiliary holding element body that is adapted for selective intermatable attachment onto a holding element body for providing auxiliary or supplemental holding capability to a strap that has been previously loaded with a bundle of tubular objects. Preferably, the auxiliary holding element defines at least one receiving area for selective connection to an associated article. The at least one receiving area of the auxiliary holding element enables the plastic holding strap to be used for fastening additional tubes, cables, or other elements to an operatively support member when the auxiliary holding element is clipped onto the primary holding element associated with the elongate holding strap. Accordingly, the range of applications of the plastic holding strap is selectively broadened or expanded by selectively clipping the auxiliary holding element with the at least one receiving area onto the primary holding element. The auxiliary holding element is connected to the primary holding element in a simple fashion.

In accordance with a more limited aspect of the invention, the auxiliary holding element is adapted to be clipped onto at least one area of the primary holding element. More particularly, the auxiliary holding element includes at least one embedable strip member extending therefrom and adapted to clip into a corresponding at least one recess formed in the primary holding element. To enable a positive connection, the auxiliary holding element includes a pair of opposing embedable strip members for connection into a corresponding set of opposing recesses formed in the primary holding element.

In accordance with yet a further limited aspect of the invention, the primary holding element is shaped in the form of truncated cone and defines an interior longitudinal opening therethrough. At least one longitudinal rib element extends radially outwardly from the body of the primary holding element for engagement with a corresponding longitudinal alignment recess defined in the auxiliary holding element. The combination of the interaction between the pair of opposing embedable strip members and the pair of opposing recesses together with the longitudinal rib element and alignment recess provides a simple, yet effective, fastening capability between the auxiliary holding element and the primary holding element.

To further provide for secure fastening between the components, the pair of opposing embedable strip members are provided on each end with a longitudinal rib extending outwardly from the strip members. The longitudinal ribs extending from the strip members are adapted to grip behind an upper edge of the interior opening defined in the primary holding element when the auxiliary holding element is fastened onto the primary holding element. The interaction between the longitudinal rib with the back surface of the upper edge of the interior opening ensures a functionally secure connection between the components in an assembled state. Further, the interaction between the longitudinal ribs and the back surface of the upper edge of the interior opening, together with the longitudinal alignment rib and longitudinal alignment recess, prevents accidental separation of the auxiliary holding element from the primary holding element of the subject plastic holding strap.

In accordance with a still further aspect of the invention, at least one storage and/or receiving area is provided on an outer curved surface of the auxiliary holding element. By locating the storage and/or receiving area on the outer curved surface of the dish-shaped area of the auxiliary holding element, several storage and/or receiving areas are selectively sequentially arranged in a direction extending from the primary holding element so that several cables or tubes can be connected onto the auxiliary holding element in a parallel arrangement. Alternatively, the present invention enables the storage and/or receiving areas to be formed in an arbitrary manner in correspondence with the particular type of tube or other associated item to be held thereby. That is, the connection area is adaptable in form and function to accommodate any type item to be held.

In accordance with a still further aspect of the invention, the auxiliary holding element has a longitudinal height that is substantially equivalent to the longitudinal height of the primary holding element, whereby the pair of embedable strip members are respectively clipped into the upper part of the passage opening and pair of recesses formed in the primary holding element. More particularly, the pair of embedable strip members are formed to extend about half the height of the auxiliary holding element.

As can be seen from the foregoing, a primary object of the invention is the provision of a holding strap system that is readily expandable for fastening additional tubes or cables onto a bundled set of elongate objects. The system includes a first holding element and a second or additional holding element.

A further object of the invention is the provision of an auxiliary holding element provided with at least one receiving area for selective connection to an associated article. The auxiliary holding element is selectively connectable to a primary holding element that includes an elongate profiled strap element for bundling a set of elongate objects.

A further object of the invention is the provision of an auxiliary holding element adapted for selected intermatably attachment onto the primary holding element, the auxiliary element defining a plurality of receiving areas for selective connection to an associated plurality of articles.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, the preferred embodiments of which will be described in detail in this specification and illustrate in the accompanying drawings which form a part hereof, and wherein:

FIG. 1 is a side elevational view of the primary holding element component formed in accordance with the present invention;

FIG. 2 is a side elevational view of the auxiliary holding element formed in accordance with the present invention;

FIG. 3 is a top plan view of the primary holding element shown in FIG. 1;

FIG. 4 is a top plan view of the auxiliary holding element shown in FIG. 2;

FIG. 5 is a side elevational view of the two main component shown in FIGS. 1 and 2 joined in their assembled condition;

FIG. 6 is a top plan view of the assembled components shown in FIG. 5;

DETAILED DESCRIPTION OF THE PREFERRED EMBODIMENT

Figure 7:
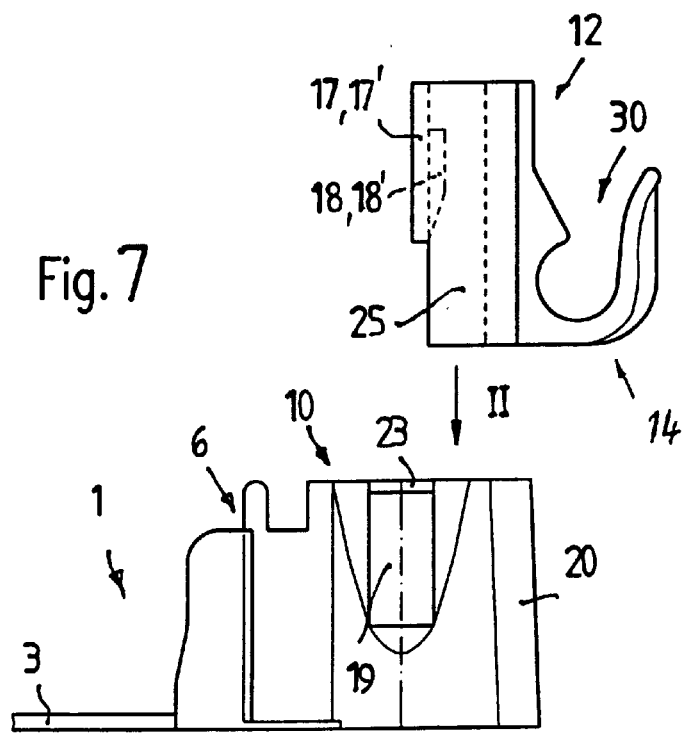
FIG. 7 is a side elevational view of the two main components shown in FIGS. 1 and 2 in aligned relationship prior to being moved to their assembled condition shown in FIGS. 5 and 6; and, FIG. 8 is a side elevational view of an alternative embodiment of the auxiliary holding element shown in FIG. 2.

Referring now to the drawings wherein the showings are for the purposes of illustrating the preferred embodiments of the invention only and not for purposes of limiting same, the FIG.s show a holding strap system 1 for fastening a bundle of elongate objects to an associated support member, the holding strap system 1 being formed from a first component including a first, or primary, holding element 10 and a second component including a second, or auxiliary, holding element 12. The first holding element 10 is shown in FIGS. 1 and 3. The auxiliary holding element is shown in FIGS. 2 and 4. In accordance with the present invention, the primary and auxiliary holding elements 10, 12 are selectively connectable as shown in FIGS. 5 and 6. FIG. 7 illustrates the two main components in aligned relationship just prior to being moved into their assembled or connected condition shown in FIGS. 5 and 6. The auxiliary holding element 12 adds an additional range of holding capabilities to the primary holding element 10 by providing one or more storage clips 30, 30', 30" in a storage and/or receiving area 14. By merely clipping the auxiliary holding element 12 onto the body of the primary holding element 10, additional tubes or other associated objects can be fastened to a support member quickly and easily.

With particular reference now to FIGS. 1 and 3, the primary holding element 10 is shown in side and top views respectively. The primary holding element is adapted to loop around, fasten, or otherwise bundle a set of associated articles (not shown) such as, for example, tubes, cables, or other elongate objects. The primary holding element 10 of the subject holding strap 1 system includes an elongate profiled strap element 3 connected to the holding element body 10. The elongate profiled strap element includes a pair of spaced apart parallel longitudinal strips 4, 4 and set of transverse rung members 5 extending between the pair of longitudinal strips 4, 4'. A head member 6 is connected to the holding element body 10 as shown. The head member 6 defines at least one passage opening 7 adapted to selectively receive a free end of the elongate profiled strap element 3 therethrough. At least one elastic locking element 8 is disposed on the holding element 10 extending into the at least one passage opening 7 for selectively engaging the set of transverse rung members 5 of the elongate strap element 3. The at least one elastic locking element 8 is operative to hold the elongate profiled strap element 3 in place relative to the head member 6.

In use, the elongate profiled strap element 3 is looped around a group of articles to fasten or otherwise bundle the articles onto the holding element 10. The strap element 3 is first looped around the articles and then the free end of the strap is inserted in the direction of arrow I into the passage opening 7 of the head member 6. There, the strap element 3 engages the elastic locking element 8 to tightly bundle the associated objects in place. Preferably, the locking element 8 permits unidirectional movement of the strap to enable only tightening of the strap around the articles while preventing loosening.

As is apparent from FIGS. 1 and 3, the holding element 10 together with the head member 6 are adapted to be joined onto an associated support member (not shown). With respect to the preferred embodiment of the invention shown in the drawings, the holding element 10 is formed in the shape of truncated cone and has at least one longitudinal rib element 20 formed on the outer circumference of the holding element extending outwardly on a side opposite from the elongate profiled strap element 3. Preferably, the longitudinal rib element 20 is disposed in a longitudinal direction and extends radially outwardly from the holding element as best shown in FIG. 3.

In addition to the above, an interior opening 21 is provided in the primary holding element 10. The interior opening 21 extends longitudinally through the holding element 10 substantially completely therethrough but is limited in its upper region by a strip member 23. In addition to the strip member 23, a pair of inwardly oriented opposing resilient tongue members 22, 22' are provided in the interior opening 21. The pair of resilient tongue members are adapted to be embedded into threads or grooves formed in a bolt or stud member joined to an associates support member (not shown) for mounting the holding element 10 onto the support member. Still further in connection with the interior longitudinal opening 21, a transverse opening 19 is provided as shown in FIG. 1. The transverse opening 19 extends cross-wise through the holding element 10 in an upper region thereof. As will be described below, the transverse opening 19 is used when the auxiliary holding element 12 is clipped onto the primary holding element 10.

As noted above, in accordance with the present invention, an additional element 12 can be selectively connected onto the primary holding element 10 of the subject plastic holding strap 1. The second holding element 12 is shown in FIGS. 2 and 4 in side and top views respectively. Of particular importance, the auxiliary holding element 12 includes at least one storage and/or receiving area 14 for receiving or clipping onto an associated tubular object (not shown). It is an advantage of the present invention that the auxiliary holding element 12 can be selectively clipped into an area of the primary holding element 10. In that regard, in order to fasten the additional element 12 onto the primary holding element 10, a set of recesses 15, 15' and embedable strip members 17, 17' are respectively provided on the main holding element 10 and the auxiliary holding element 12. Preferably, a pair of opposing recesses 15, 15' are provided in the holding element 10 (FIG. 3) and a corresponding pair of opposing embedable strip members 17, 17' are formed on the second holding element 12 (FIG. 4).

As shown best in FIG. 3, the pair of recesses 15, 15' are formed as part of the interior longitudinal opening 21 and, in that regard, are formed contiguously therewith. In FIGS. 4 and 6, the pair of embedable strip members 17, 17' are shown arranged on an end region of a dish or cylindrically shaped area 25 of the auxiliary holding element 12. The dish area 25 includes a central longitudinal alignment recess 27 shown best in FIGS. 4 and 6. The central recess 27 is adapted to receive a corresponding longitudinal guide rib 20 extending radially outwardly from the holding element 10 as shown in FIGS. 1 and 3.

As shown in FIG. 4, the pair of opposing embedable strip members 17, 17' each have, respectively, on their end regions, a longitudinal rib member 18, 18'. The longitudinal rib members 18, 18' are adapted to engage beneath an upper edge of the inner opening 21 of the holding element 10 when the auxiliary holding element 12 is connected onto the holding element 10 shown best in FIG. 5 and 6.

As shown in FIGS. 1 and 2, the additional holding element 12 has substantially the same height H as the primary holding element 10. Further as shown there, the pair of embedable strip members 17, 17' extend downwardly approximately half the height H/2 of the additional element 12. The longitudinal rib members 18, 18' on the longitudinal embedable strip members 17, 17' are shorter than the strip members. Generally, the embedable strip member 17, 17' and the longitudinal ribs 18, 18' are preferably located or otherwise disposed in the upper region of the additional holding element 12.

Turning now to FIG. 7, the first and second holding elements 10, 12 are shown in their aligned relationship prior to being moved together in a direction II toward their connected or assembled condition shown in FIG. 5 and 6. To join the components together, as shown in FIG. 7, the auxiliary holding element 12 is moved from above in the direction of the arrow II and pushed onto the holding element 10 whereupon the pair of embedable strip members 17, 17' are used initially as a guide. More particularly, the embedable strip members 17, 17' help guide the auxiliary holding element 12 along the primary holding element 10 and into place until the pair of longitudinal ribs 18, 18' engage behind the upper edge 24 (FIGS. 5 and 6) of the primary holding element 10. The longitudinal guide rib 20 also helps guide the first and second holding elements 10, 20 together.

The curvature of the cylindrical or dish-shaped area 25 is advantageously adapted to conform to the outer circumference of the first holding element 10 so that, as shown in FIG. 6, the auxiliary holding element 12 intermatably connects to the first holding element 10 as a "single piece" assembled unit. When the second holding element 12 is intermatably connected with the first holding element 10, the storage and/or receiving area 14 on the second holding element 10 enables additional holding capacity for clipping additional tubes, cables, or other associated objects onto the associated support member and primary holding element.

Figure 8:
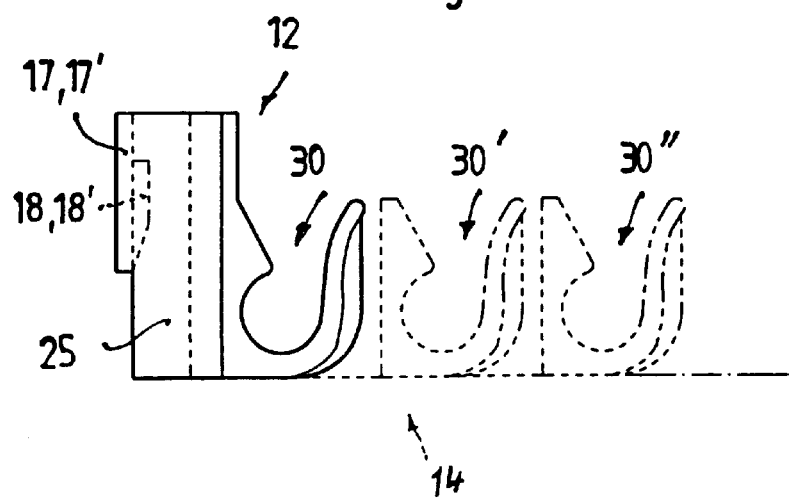

In the first embodiment of the auxiliary holding element 12 shown in FIGS. 2–7, a single storage dish or clip member 30 is provided for selectively clipping onto associated members. As shown in FIG. 8, however, it is possible to alternatively provide several sequentially arranged storage dishes or clips 30, 30', and 30" for fastening tubes or cables in a spaced apart parallel relationship. Although three dish or clip areas are shown in FIG. 8, four or more can be alternatively provided. Further, other clip-type or connection schemes can be substituted for the dish-shaped clips 30, 30', 30" such as, for example, in the form of cones or holding regions so that additional non tubular shaped components having irregular shapes or the like can be fastened using the subject plastic holding strap 1 via specialized additional elements 12. Overall, the application range of the subject holding strap system 1 is expanded by the diverse possibilities for clips, holding regions, or connecting areas formed on the auxiliary holding element 12.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A plastic holding strap for use in bundling objects and fastening the bundled objects to an associated support member, the holding strap comprising:

a holding element selectively connectable onto the associated support member;

an elongate profiled strap element connected to the holding element, the elongate profiled strap element including a pair of spaced apart parallel longitudinal strips and a set of transverse rung members extending between the pair of parallel longitudinal strips;

a head member connected to the holding element and to a first end of the elongate profiled strap element, the head member defining at least one passage opening adapted to selectively receive a second free end of the elongate profiled strap element therethrough;

at least one elastic locking element extending into the at least one passage opening for selectively engaging said set of transverse rung members to hold the elongate profiled strap element in place relative to the head member; and, an auxiliary holding element selectively intermatable with the holding element, the auxiliary holding element defining at least one receiving area for selective connection to an associated article, and including at least one dish shared storage member for connecting an associated elongate article to the auxiliary holding element.

2. The plastic holding strap according to claim 1 wherein; the auxiliary holding element and the holding element are adapted selectively clip together; and, the auxiliary holding element includes a plurality of dish-shaped storage members for connecting a plurality of associated elongate articles t the auxiliary holding element.

3. A plastic holding strap for use in bundling objects and fastening the bundled objects to an associated support member, the holding strap comprising:

a holding element selectively connectable onto the associated support member;

an elongate profiled strap element connected to the holding element, the elongate profiled strap element including a pair of spaced apart parallel longitudinal strips and a set of transverse rung members extending between the pair of parallel longitudinal strips;

a head member connected to the holding element and to a first end of the elongate profiled strap element, the head member defining at least one passage opening for selectively receiving a second free end of the elongate profiled strap element therethrough;

at least one elastic locking element extending into the at least one passage opening for selectively engaging said set of transverse rung members to hold the elongate profiled strap element in place relative to the head member: and, an auxiliary holding element selectively attachable onto the holding element, the auxiliary holding element defining at least one receiving area for selective connection to an associated article, the auxiliary holding element including at least one embedable strip members, the holding element including at least one recess adapted to receive the at least one embedable strip member when the holding element and the auxiliary holding element are selectively attached together.

4. The plastic holding strap according to claim 3 wherein:
the auxiliary holding element includes a pair of opposing embedable strip members; and, the holding element includes a pair of opposing recesses adapted to receive the pair of embedable strip members when the holding element and the auxiliary holding element are selectively clipped together.

5. The plastic holding strap according to claim 4 wherein:
the holding element is shaped substantially in the form of a truncated cone and includes a longitudinal rib element extending outwardly from a side of the holding element opposite from said elongate profiled strap element, the holding element defining an interior longitudinal opening extending longitudinally therethrough, the pair of opposing recesses being contiguous with the interior opening; and, the auxiliary holding element includes a dish shaped area conforming in shape to the truncated cone, the dish shaped area including a longitudinal central recess adapted to receive the longitudinal rib element of the holding element therein when the auxiliary holding element and the holding element are selectively clipped together, the pair of opposing embedable strip members being carried on opposite ends regions of the dish shaped area for selective engagement with the pair of opposing recesses when the auxiliary holding element and the holding element are selectively clipped together.

6. The plastic holding strap according to claim 5 wherein:
the holding element includes an upper lip edge disposed at an upper end of the interior longitudinal opening; and, the pair of opposing embedable strip members include longitudinal engagement ribs adapted to engage the upper lip edge when the auxiliary holding element is intermatedly connected with the holding element to selectively hold the auxiliary holding element and the holding element connected.

7. The plastic holding strap according to claim 6 wherein the at least one receiving area is disposed on the auxiliary holding element on a side opposite from the dish shaped area.

8. The plastic holding strap according to claim 7 wherein the at least one receiving area comprises at least one of i) a dish shaped storage member adapted to connect an associated elongate article to the auxiliary holding element, and ii) a plurality of dish shaped storage members adapted to connect a plurality of associated elongate articles to the auxiliary holding element.

9. The plastic holding strap according to claim 8 wherein:
the auxiliary holding element has a height substantially corresponding to a height of the holding element; and, the pair of opposing embedable strip members on the auxiliary holding element are adapted to selectively engage with an upper portion of the pair of opposing recesses formed in the holding element.

10. The plastic holding strap according to claim 9 wherein the pair of opposing embedable strip members extend over substantially half said height of the auxiliary holding element.

11. The plastic holding strap according to claim wherein the elongate profiled strap element, the head member, and the at least one elastic locking element are formed integrally with said holding element.

12. The plastic holding strap according to claim 11 wherein the auxiliary holding element and the holding element are adapted to selectively clip together.

13. A holding strap system for fastening a bundle of elongate objects to an associated support member, the holding strap system comprising:

a first holding element adapted for selective connection to the associated support member, the first holding element including:

an elongate strap element extending from the first holding element and terminating at a free end, the elongate strap element including a pair of spaced-apart parallel longitudinal strips and set of transverse rung members extending between the pair of parallel longitudinal strips;

a head member defining at least one passage opening adapted to selectively receive the free end of the elongate strap element therethrough; and, at least one elastic locking element extending into the at least one passage opening for selectively engaging said set of transverse rung members to hold the elongate profiled strap element in place relative to the head member; and, a second holding element selectively slidably connectable with the first holding element, the second holding element defining at least one clip-like receiving area adapted to selectively clip onto an associated elongate article to hold the article relative to the support member when the second holding element is slidably connected with the first holding element.

14. The holding strap system 1 according to claim 13 wherein the elongate strap element, the head member, and the at least one elastic locking element are formed integrally with the first holding element.

15. A holding strap system for fastening a bundle of elongate objects to an associated support member, the holding strap system comprising:

a first substantially cylindrically shaped holding element selectively connectable to the associated support member, the first holding element including:

an elongate strap element extending from the first holding element and terminating at a free end, the elongate strap element including a pair of spaced-apart parallel longitudinal strips and set of transverse rung members extending between the pair of parallel longitudinal strips;

a head member defining at least one passage opening adapted to selectively receive the free end of the elongate strap element therethrough;

at least one longitudinally extending alignment rib element; and, at least one elastic locking element extending into the at least one passage opening for selectively enraging said set of transverse run members to hold the elongate profiled strap element in place relative to the head member; and, a second holding element selectively slidably connectable with the first holding element, the second holding element defining at least one clip-like receiving area adapted to selectively clip onto an associated elongate article to hold the article relative to the support member when the second holding element is slidably connected with the first holding element, the second holding element having a cylindrically shaped area and including at least one alignment recess extending longitudinally relative to the cylindrically shaped area, the at least one alignment recess being shaped to intermatably receive the at least one longitudinally extending alignment rib element when the first and second holding elements are selectively connected, the elongate strap element, the head member, and the at least one elastic locking element being formed integrally with the first holding element.

16. The holding strap system 1 according to claim 15 wherein at least one of the first holding element and the second holding element includes an embedable strip element for selectively connecting the at least one of the first holding element and the second holding element to the other one of the first holding element and the second holding element; and, said other one of the first holding element and the second holding element includes a recess adapted to receive the embedable strip element, the recess and the strip element cooperatively selectively connecting the first holding element and the second holding element together.

17. The holding strap system 1 according to claim 16 wherein the second holding element defines a plurality of clip-like receiving areas.

18. The holding strap system 1 according to claim 16 wherein:

the first holding element includes and upper lip edge disposed at an upper end of an interior longitudinal opening through the first holding element; and, the strip element includes at least one longitudinal engagement rib adapted to engage the upper lip edge when the first and second holding elements are selectively intermatably connected together to selectively hold the second holding element and the first holding element connected.

19. The holding strap system 1 according to claim 16 wherein:

the second holding element has a height substantially corresponding to a height of the first holding element; and, the embedable strip element is selectively engagable with an upper portion of said recess formed in the first holding element.

20. The holding strap system 1 according to claim 19 wherein the embedable strip element extends over substantially half said height of the second holding element.

* * * * *